United States Patent Office 2,796,493
Patented June 18, 1957

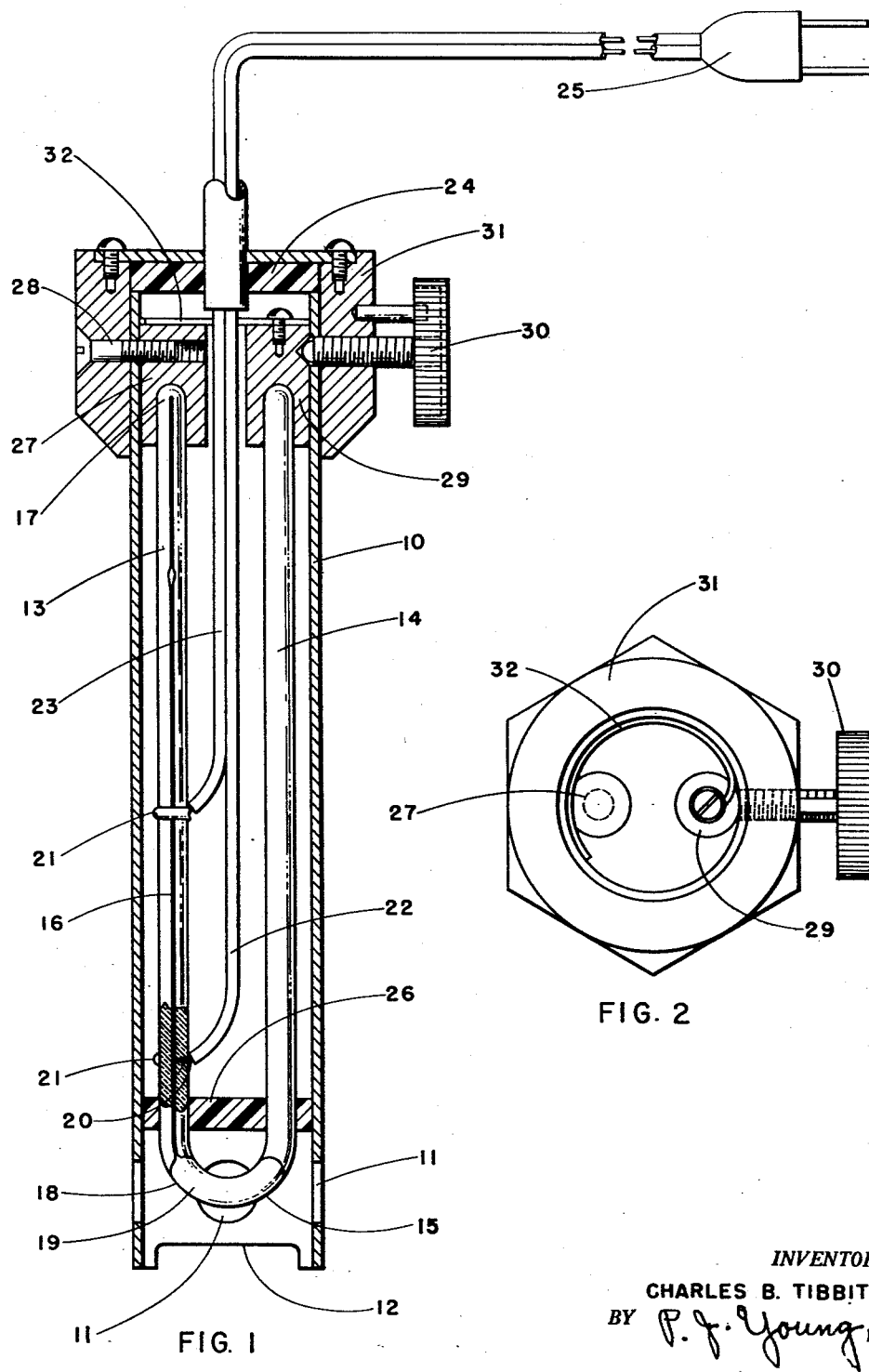

2,796,493

ADJUSTABLE THERMOMETER CONTROLLER

Charles B. Tibbits, Gahanna, Ohio, assignor to Taylor Instrument Companies, Rochester, N. Y., a corporation of New York Original application June 9, 1954, Serial No. 435,536, now Patent No. 2,745,925, dated May 15, 1956. Divided and this application March 22, 1956, Serial No. 573,218

4 Claims. (Cl. 200—141)

My invention relates to thermometers and more particularly to an adjustable electric contact thermometer adapted for employment as a temperature controller. This application is a division of copending application for "Adjustable Thermometer Controller," Serial No. 435,536, filed June 9, 1954, now Patent No. 2,745,925, assigned to the same assignee as the instant application.

Heretofore, electric contacts have been sealed at predetermined points in the tubes or stem of glass thermometers so that they project into the tube bore whereby the mercury column on rising therein engages the contacts to complete various electric circuits to operate or control alarms and the like. However, most such thermometers known to applicant are unadjustable in that the circuits controlled thereby are always completed at the same or a fixed temperature. On the other hand, those prior art thermometers which are adjustable have disadvantages associated therewith such as the necessity of adding or subtracting the expansible fluid therein from the bulb-bore system in order to vary the temperature at which a circuit or circuits controlled thereby are completed.

It is therefore an object of this invention to provide a new and improved electric contact thermometer.

It is also an object of the invention to provide an electric contact thermometer which is continuously adjustable in the sense that adjustments may be manually accomplished without the necessity of adding or removing expansible fluid from the bulb-bore system thereof and independently of temperature changes.

The invention will be better understood from the following description when taken in connection with the accompanying drawing and the scope of the invention will be pointed out in the appended claims.

In the drawings, Fig. 1 is a side elevation view, partly in section, of a thermometer of the invention and Fig. 2 is a top plan view of the device shown in Fig. 1 with a cover provided therefor removed.

Referring now to Fig. 1 of the drawing, the device illustrated comprises a casing 10 having a number of openings or apertures 11 adjacent an open end 12 thereof. However, the thermometer proper comprises a U-shaped element having a pair of relatively rigid legs 13 and 14 interconnected by a curved base portion 15. Leg 13 comprises a stem of insulating material, such as glass, having a bore 16 therein closed or sealed at one end of the stem as at 17. The opposite end of the bore 16 is in communication with a reservoir 18 provided in the interconnecting portion 15. The reservoir 18 contains a temperature sensitive electric conducting fluid 19 which, in response to temperature variations about the reservoir, expands and contracts or rises and falls within the bore 16. So that expansion or contraction of the conducting fluid 19 may be effective to complete or interrupt a control circuit or circuits, two or more spaced electric conductors extending from the exterior through the wall of the stem into the bore thereof are provided.

A pair of such conductors, for example, have been illustrated in Fig. 1. The conductors are identical and each comprises a platinum wire, 20, for example, fused in the stem wall, in the case of glass, or otherwise suitably sealed in the case of other materials with one end of each wire projecting into the bore and path of the expansible conducting fluid to complete the circuit while the other end projects from the exterior of the stem. The exterior portion of each wire is, in turn, electrically connected to a collar 21 of conducting material encircling the stem and to which a pair of insulated electric conductors or leads 22 and 23 may be conveniently electrically connected as by solder. The leads pass through an upper removable cover 24 of the casing while the outer end thereof are connected to a plug 25 for convenient connection of the thermometer to a device whose operation is to be controlled, such as the ignition and fuel control motor of a furnace or the operating control circuit of a refrigeration compressor, for example. Of course, it will be understood that one of the thermometer conductors may be fused in the wall of the reservoir or bulb 18 with one or more of the conductors fused in the wall of the stem. Otherwise, the leg 14 may be a solid stem of glass or other suitable material.

As shown, the U-shaped element is supported in the casing, with the portion 15 thereof adjacent the openings of the casing, by a resilient but nevertheless relatively rigid disk 26 of rubber or other suitable material. The upper or free end of leg 13 is confined within an opening in an element 27 which is immovably fixed to the casing 10 by a screw 28 so that the free end of leg 13 is thereby also immovably fixed with respect to the casing. On the other hand, the free end of leg 14 is confined within an opening of an element 29 which is movable with respect to the casing. Thus, an adjustment screw 30 threaded in the casing wall or in a collar or upper flange 31 thereon, as illustrated, may be employed to force element 29 and the free end of leg 14 away from the casing and toward fixed leg 13 against the natural tendency of leg 14 to spring back away from leg 13. In response to the application of such force by the adjustment screw 30, the volume of reservoir 18 is thereby reduced to force the temperature sensitive conducting fluid upwardly in the bore 16 closer to the upper contact. By virtue of the U-shaped configuration of the thermometer element in general, the curvature of interconnecting portion 15, the length of the lever arm presented by leg 14, etc. in particular, an elastic or resilient means is thus incorporated as a feature of the device. Once the position of the column of temperature sensitive conducting fluid has been set in bore 16 by manual adjustment screw 30, it should not, of course, be permitted to be varied except by temperature changes about the reservoir 18. Therefore, to insure against such changes which might be caused by other external forces such as vibrations, a coil of spring material 32 may be mounted on element 29 as illustrated. As will be apparent, coil 32 provides an additional force firmly biasing element 29 against the end of adjustment screw 30.

While I have, in accordance with the patent statutes, shown and described a particular embodiment of my invention, it will be obvious that changes and modifications can be made without departing from the invention in its broader aspects and, I, therefore, aim in the appended claims to cover all such changes and modifications as fall within the true spirit and scope of the invention.

What I claim as new and desire to secure by Letters Patent of the United States is:

1. An adjustable thermometer comprising a U-shaped element having a pair of rigid legs interconnected by a base portion, one of said legs having a bore therein, a compressible reservoir in said base portion in communication with said bore, a temperature sensitive liquid in said reservoir, said liquid being movable by expansion and contraction within said bore in response to temperature variations about said reservoir, the free ends of said rigid legs being movable toward and away from each other to adjustably vary the volume of said reservoir and thereby manually move said liquid within said bore.

2. An adjustable electric contact thermometer comprising a U-shaped element having a pair of relative rigid legs interconnected by a base portion, one of said legs comprising a stem of insulating material having a bore therein, a reservoir in said base portion in communication within said bore, a liquid of conducting material in said reservoir, said liquid being movable by expansion and contraction with said bore in response to temperature variations, an electric conductor extending through the wall of said stem into the bore thereof and means engageable with the other of said legs adjacent the free end thereof and adapted to apply a force thereto to cause movement of said other leg relative to said one leg, said engageable means and movement caused thereby tending to compress said reservoir to vary the volume therein and thereby move said liquid within said bore relative to said conductor.

3. An adjustable electric contact thermometer comprising a U-shaped element having a pair of relative rigid legs interconnected by a base portion, one of said legs comprising a stem of insulating material having a bore therein, a reservoir in said base portion in communication with said bore, a liquid of conducting material in said reservoir, said liquid being movable by expansion and contraction within said bore in response to temperature variations, an electric conductor extending through the wall of said stem into the bore thereof and manual means operative to cause movement of said liquid in said reservoir within said bore relative to said conductor, said manual means comprising an adjustable element engageable with the other of said legs adjacent the free end thereof and operative to cause movement of said other leg relative to said one leg tending to vary the volume in said reservoir.

4. In combination, a relatively rigid tubular casing having an open end, an adjustable electric contact thermometer comprising a U-shaped element having a pair of relatively rigid legs interconnected by a base portion, said thermometer being supported in said casing with said base portion positioned adjacent said open end thereof, the free end of one of said legs being immovably fixed and the free end of the other of said legs being movable with respect to said casing, means engageable with the free end of said other leg including resilient means normally biasing said other leg away from said one leg, said one leg comprising a stem of insulating material having a bore therein, a reservoir in said base portion in communication with said bore, a liquid of conducting material in said reservoir, said liquid being movable by expansion and contraction within said bore in response to temperature variations, a pair of spaced conductors extending through the wall of said stem into the bore thereof, and manual means operative to vary the volume of said reservoir to cause shifting movement of said liquid in said reservoir within said bore relative to said pair of electric conductors, said manual means comprising an adjustment screw threadedly mounted on said casing with an end of said screw engageable with said other leg engageable means, said resilient means and said screw being operative to movably position said free end of said other leg relative to said immovably fixed end of said one leg and thereby adjustably vary the volume of said reservoir.

References Cited in the file of this patent

UNITED STATES PATENTS

| 2,127,159 | Collins, 3d | Aug. 16, 1938 |
| 2,266,103 | Van Guilder | Dec. 16, 1941 |